US 8,429,361 B2

(12) United States Patent
Higashikado et al.

(10) Patent No.: US 8,429,361 B2
(45) Date of Patent: Apr. 23, 2013

(54) INFORMATION-STORAGE SYSTEM (75) Inventors: Yoshiki Higashikado, Kawasaki (JP); Kuniko Omido, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 266 days.

(21) Appl. No.: 13/019,598

(22) Filed: Feb. 2, 2011

(65) Prior Publication Data
US 2011/0202736 A1   Aug. 18, 2011

(30) Foreign Application Priority Data
Feb. 12, 2010   (JP) .................................. 2010-29237

(51) Int. Cl.
*G06F 13/00* (2006.01)
(52) U.S. Cl.
USPC ......................................... 711/162; 711/156
(58) Field of Classification Search .................. 711/156, 711/162
See application file for complete search history.

(56) References Cited

U.S. PATENT DOCUMENTS
7,698,392 B2 *  4/2010  Zapata et al. ................. 709/220
8,214,338 B1 *  7/2012  Kirchhoff et al. ............. 707/693

FOREIGN PATENT DOCUMENTS
JP  2008-084327 A  4/2008
JP  2009-193258 A  8/2009

* cited by examiner

*Primary Examiner* — Reba I Elmore
(74) *Attorney, Agent, or Firm* — Fujitsu Patent Center (57) ABSTRACT

An information-storage system storing information includes, an information-storage unit configured to store data, an encoding/decoding unit configured to encode and store input data in the information-storage unit, and decode and output the encoded data stored in the information-storage unit upon receiving a request for an information output, a transmission unit configured to output the encoded data stored in the information-storage unit, the encoded data being left undecoded, and store the encoded data in a backup spot different from the information-storage unit, a status-monitoring unit configured to monitor an unusual status of the information-storage system, and a selection unit configured to select the transmission unit between the encoding/decoding unit and the transmission unit when the status-monitoring unit confirms the unusual status of the information-storage system.

8 Claims, 5 Drawing Sheets

| LEVEL | PRIORITY | WAITING TIME (SECOND) |
|---|---|---|
| INFO | 3 | 3600 |
| WARNING | 2 | 1800 |
| EMERGENCY | 1 | 300 |

INFORMATION-STORAGE SYSTEM

CROSS-REFERENCE TO RELATED APPLICATIONS

This application is based upon and claims the benefit of priority of the prior Japanese Patent Application No. 2010-029237, filed on Feb. 12, 2010, the entire contents of which are incorporated herein by reference.

FIELD

Embodiments discussed herein relate to an information-storage system.

BACKGROUND

Hitherto, information-storage systems have been widely used. In recent years, information is stored in the information-storage systems as digital data. Some of the information-storage systems have large storage capacity. In that case, the system and information stored in the system may be administered by different administrators. For example, there might be a case where the information-storage system is installed in a data center or the like, the logical volume of the information-storage system is divided into at least two division units, and the division units are lent to different companies. In that case, the administrator of the system may be a data center-operation company, for example. The system administrator performs the system-error management, the storage capacity-assignment to each of the division units, and so forth. On the other hand, the information administrator may be each of the companies borrowing the division units. The information administrator makes backup copies of information stored in the division unit lent to the information administrator, for example.

When the system and the information of the system are administered by different administrators as described above, a password or the like used to access information stored in a logical volume belonging to each of the division units is given only to each of the information administrators of the individual division units for security's sake. The security of the password or the like is ensured so that the system administrator is not informed of the password. Consequently, it is difficult for the system administrator to access the information stored in the logical volume belonging to each of the division units.

When the security is ensured as described above, it is difficult for the system administrator to view the logical volume of each of the division units even though the system administrator wishes to make backup copies of data of the entire system for the sake of system administration, for example, for making safety provisions when an error occurs in the system. Therefore, it is difficult for the system administrator to make backup copies of data of the entire system, so that a request to make the backup copies should be transmitted to the information administrator of each of the division units and the information administrators should make the backup copies by themselves.

Accordingly, technologies for making backup copies of data with facility have been proposed (see Japanese Patent Laid-Open No. 2008-84327, Japanese Patent Laid-Open No. 2009-193258, and so forth).

However, each of the technologies that are proposed in Japanese Patent Laid-Open No. 2008-84327, Japanese Patent Laid-Open No. 2009-193258, and so forth does not allow the system administrator to make the backup copies of data of the entire system.

SUMMARY

According to an aspect of the embodiment, an information-storage system storing information includes, an information-storage unit configured to store data, an encoding/decoding unit configured to encode and store input data in the information-storage unit, and decode and output the encoded data stored in the information-storage unit upon receiving a request for an information output, a transmission unit configured to output the encoded data stored in the information-storage unit, the encoded data being left undecoded, and store the encoded data in a backup spot different from the information-storage unit, a status-monitoring unit configured to monitor an unusual status of the information-storage system, and a selection unit configured to select the transmission unit between the encoding/decoding unit and the transmission unit when the status-monitoring unit confirms the unusual status of the information-storage system.

The object and advantages of the embodiment will be realized and attained by at least the elements, features, and combinations particularly pointed out in the claims.

It is to be understood that both the foregoing general description and the following detailed description are exemplary and explanatory and are not restrictive of the embodiment, as claimed.

DESCRIPTION OF THE EMBODIMENTS

Hereinafter, embodiments of an information-storage system will be described with reference to the attached drawings.

Figure 1:
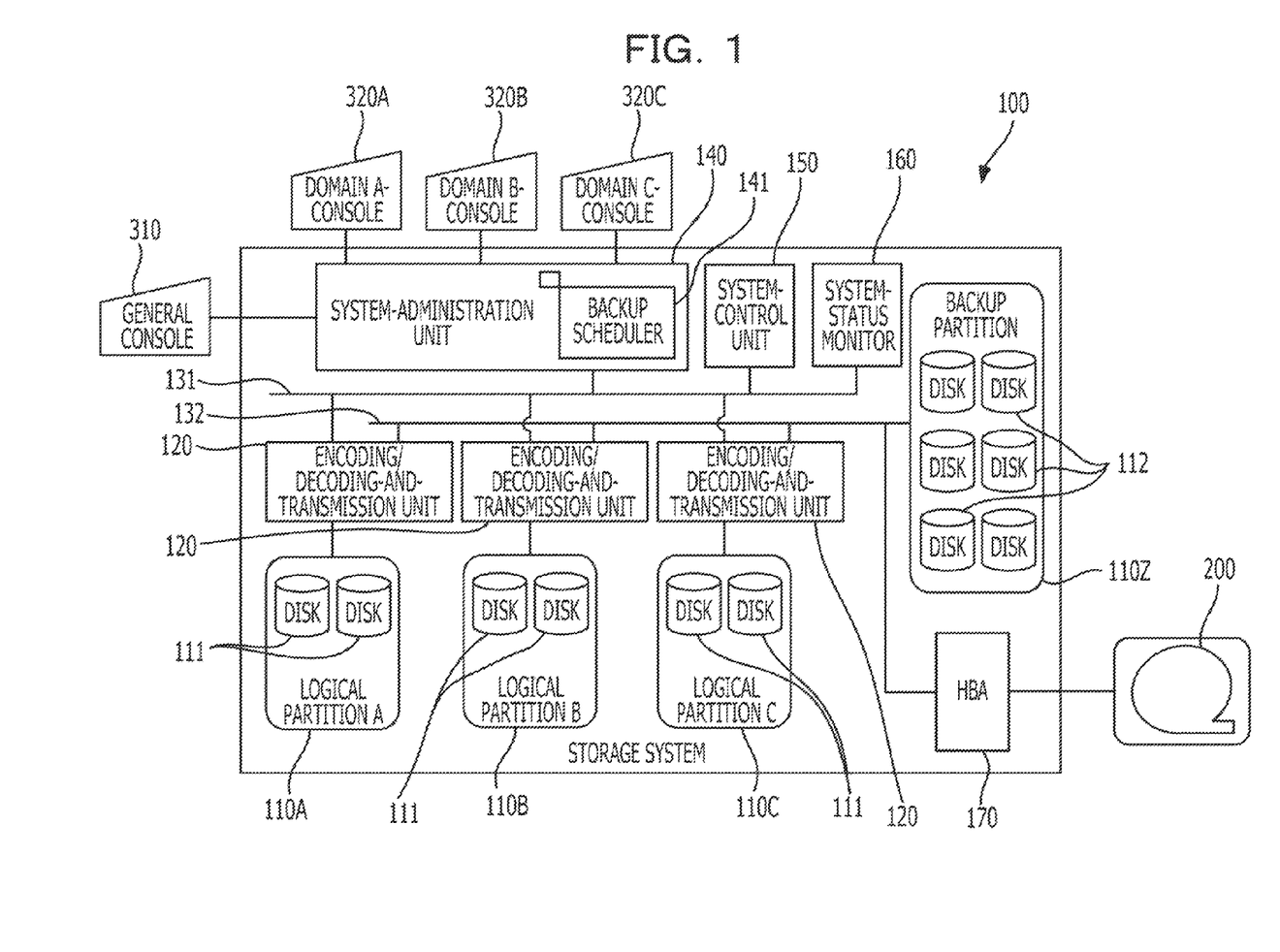
FIG. 1 illustrates a storage system corresponding to an information-storage system according to a first embodiment of the present invention.

FIG. 1 illustrates the storage system corresponding to an information-storage system according to a first embodiment.

A storage system 100 illustrated in FIG. 1 includes logical partitions 110A, 110B, and 110C that are obtained by dividing a logical volume into at least two partitions (three partitions in the present embodiment). Physical hard disks 111 are assigned to each of the logical partitions 110A to 110C. An encoding/decoding-and-transmission unit 120 functioning as the entrance and exit of data is connected to each of the logical partitions 110A to 110C. A normal bus 131 and an emergency bus 132, each of which functions as the path of data, are connected to each of the encoding/decoding-and-transmission units 120. The normal bus 131 functions as the path of data exchanged between the storage system 100 and an external server, for example, as will be described later. Each of the logical partitions 110A to 110C corresponds to an exemplary information-storage unit storing data.

On the other hand, the emergency bus 132 functions as the path of data targeted for backup during the emergency as will be described later. A backup partition 110Z storing data targeted for backup and a host bus adaptor (HBA) 170 provided to output the data targeted for backup from the storage system 100 are connected to the emergency bus 132. Hard disks 112 that are physically separated from the hard disks 111 that are assigned to the individual logical partitions 110A to 110C are assigned to the backup partition 110Z. A magnetic-tape device 200 provided as a storage spot where the data targeted for backup is stored is connected to the storage system 100 via the host bus adaptor 170. The data targeted for backup is transferred from the backup partition 110Z and is stored in the magnetic tape device 200.

The storage system 100 illustrated in FIG. 1 includes a system-administration unit 140 provided to make settings on the storage system 100 based on, for example, an instruction transmitted from a manager. The system-administration unit 140 includes a backup scheduler 141 provided to lead the creation of backup copies of data during the emergency.

A general console 310 operated by an administrator taking charge of the general administration of the storage system 100 is connected to the system-administration unit 140 via a local area network (LAN), for example. The administrator transmits an instruction to make backup copies of data of the entire system to the system-administration unit 140 and/or makes a diagnosis of the system via the system-administration unit 140 when an error occurs in the system, for example, by operating the general console 310. Further, the administrator instructs the system-administration unit 140 to assign the hard disks 111 to each of the logical partitions 110A to 110C.

The system-administration unit 140 is also connected to domain consoles 320A, 320B, and 320C that are operated through administrators administering data stored in the logical partitions 110A to 110C via the LAN, for example. The administrators make backup copies of data stored in the individual logical partitions, set a code used through the encoding/decoding-and-transmission unit 120, etc., via the system-administration unit 140 by operating the domain consoles.

The storage system 100 illustrated in FIG. 1 also includes a system-control unit 150 provided to control operations of the entire storage system 100 based on the settings that are made through the system-administration unit 140. The storage system 100 further includes a system-status monitor 160 provided to monitor various internal statuses of the storage system 100. The system-status monitor 160 corresponds to an exemplary status-monitoring unit provided to monitor an unusual status of the information-storage system.

Here, inputting data to and/or outputting data from each of the logical partitions 110A to 110C will be specifically described.

Figure 2:
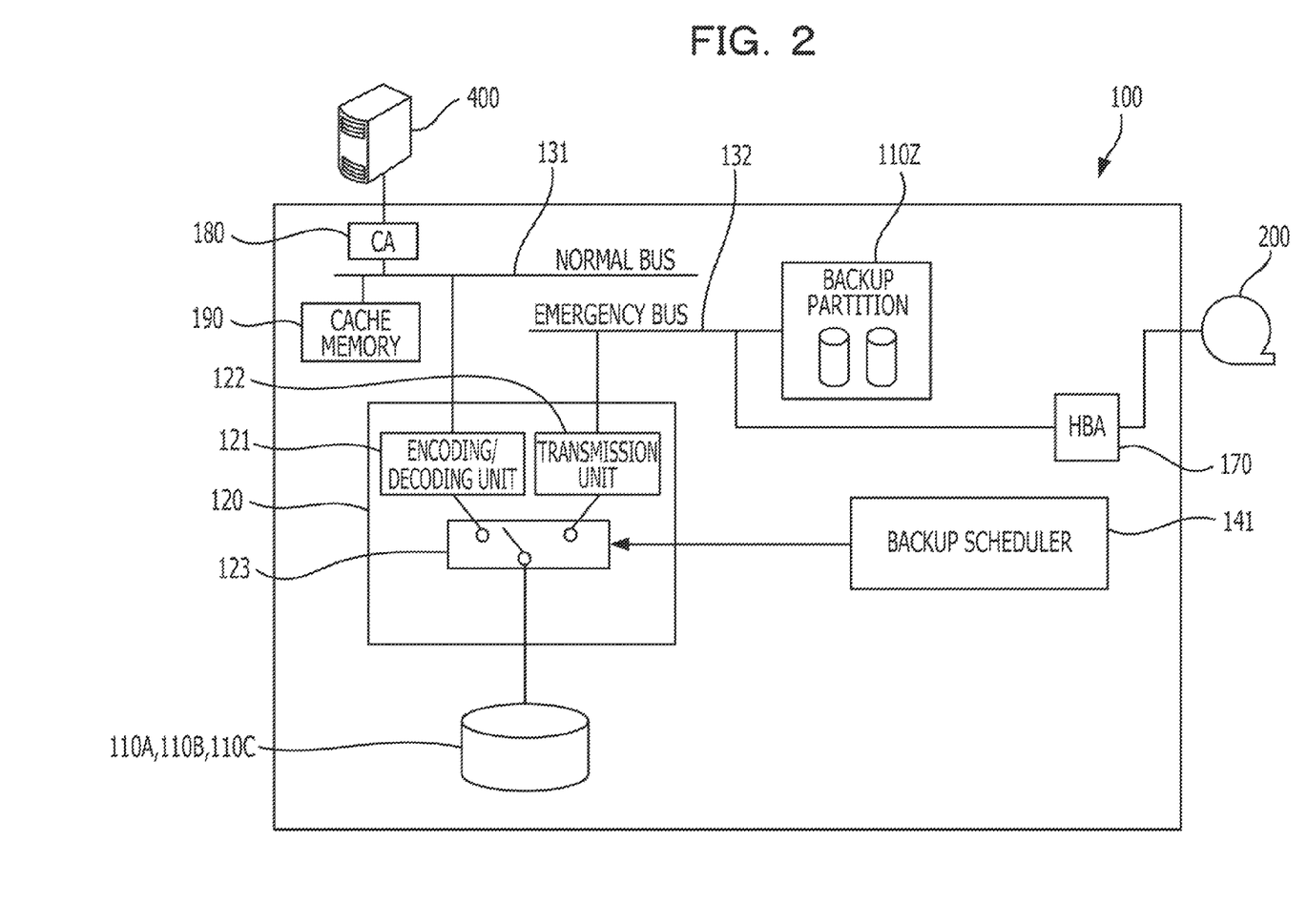
FIG. 2 illustrates details of a configuration relating to inputting data to and/or outputting data from logical partitions.

FIG. 2 illustrates the details of a configuration relating to inputting data to and/or outputting data from each of the logical partitions 110A to 110C.

Of the components of the storage system 100, the backup partition 110Z, the encoding/decoding-and-transmission unit 120, the normal bus 131, the emergency bus 132, the backup scheduler 141, and the host-bus adaptor 170, which are illustrated in FIG. 1, are also illustrated in FIG. 2. Further, in FIG. 2, the logical partitions 110A, 110B, and 110C are not separated from one another, but illustrated collectively.

The storage system 100 includes a channel adaptor (CA) 180 and a cache memory 190 that are not illustrated in FIG. 1. The channel adaptor 180 and the cache memory 190 are connected to the normal bus 131 and an external server 400 is connected to the channel adaptor 180 via a fibre channel. The external server 400 transmits data to and/or receives data from at least one of the logical partitions 110A to 110C, to which the external server 400 is granted access.

The data which is transmitted from the server 400 and stored in each of the logical partitions 110A to 110C is temporarily accumulated in the cache memory 190 via the channel adaptor 180 and the normal bus 131. After that, the data stored in the cache memory 190 is forwarded to the encoding/decoding-and-transmission unit 120 via the normal bus 131.

As illustrated in FIG. 2, the encoding/decoding-and-transmission unit 120 includes an encoding/decoding unit 121, a transmission unit 122, and a switch 123. The switch 123 is provided to selectively connect one of the encoding/decoding unit 121 and the transmission unit 122 to each of the logical partitions 110A to 110C. Usually, the switch 123 connects each of the logical partitions 110A to 110C to the encoding/decoding unit 121. The above-described switching is performed through the switch 123 under the control of the backup scheduler 141. The function of the encoding/decoding-and-transmission unit 120 may be achieved through firmware. In that case, the switch 123 can be achieved by providing data of a flag indicating whether or not the program of the switch 123 should be decoded on the cache memory 190 and causing the processing of the program to branch off based on the value of the flag data.

The data transmitted from the cache memory 190 to the encoding/decoding-and-transmission unit 120 is encoded with the encoding/decoding unit 121 and becomes encoded data. The encoded data is transferred and stored in each of the logical partitions 110A to 110C. The encoding performed with the encoding/decoding unit 121 is set by each of the administrators administering the logical partitions 110A to 110C as described above. Consequently, the data is encoded differently for each of the logical partitions 110A to 110C and the security of the data is ensured. That is, the encoding/decoding unit 121 corresponds to an exemplary encoding/decoding unit that encodes and stores the data in the information-storage unit, and that decodes and outputs the encoded data stored in the information-storage unit.

First, the data that is acquired from each of the logical partitions 110A to 110C and transferred to the server 400 is decoded with the encoding/decoding unit 121 of the encoding/decoding-and-transmission unit 120. Then, the decoded data passes through the normal bus 131 and is temporarily accumulated in the cache memory 190. After that, the data accumulated in the cache memory 190 is forwarded to the server 400 via the normal bus 131 and the channel adaptor 180.

Under normal conditions, the above-described input/output of the data is performed. During the emergency, however, data targeted for backup is output. During the emergency, the backup scheduler 141 switches the switch 123 of the encoding/decoding-and-transmission unit 120 to the transmission-unit 122-side. Then, the transmission unit 122 transmits the encoded data stored in each of the logical partitions 110A to 110C to the emergency bus 132, the encoded data being left undecoded. The encoded data is stored in the backup partition 110Z via the emergency bus 132.

The transmission unit 122 corresponds to an exemplary transmission unit provided to output encoded data stored in the information-storage unit, the encoded data being left undecoded. The backup partition 110Z corresponds to an exemplary backup spot separate from the information-storage unit. A combination of the switch 123 and the backup scheduler 141 corresponds to an exemplary selection unit provided to select the transmission unit 122 when the status-monitoring unit confirms the unusual status.

In the present embodiment, the data path which is used under normal circumstances is physically separated from the data path used during the emergency, which increases the safety of the encoded data. The above-described fact indicates that the following application mode is appropriate. The appropriate application mode includes first and second buses.

The first bus is connected to the above-described encoding/decoding unit so that each of data which is stored in the information-storage unit via the encoding/decoding unit and that which is output from the information-storage unit via the encoding/decoding unit passes through the first bus.

The second bus, which is isolated from the first bus, is connected to the above-described transmission unit so that the encoded data which is output from the information-storage unit via the transmission unit passes through the second bus.

The above-described normal bus 131 corresponds to an example of the first bus. Further, the emergency bus 132 corresponds to an example of the second bus.

Hereinafter, further details of the operations that are performed to back up data in the storage system 100 of the present embodiment will be furnished.

Figure 3:
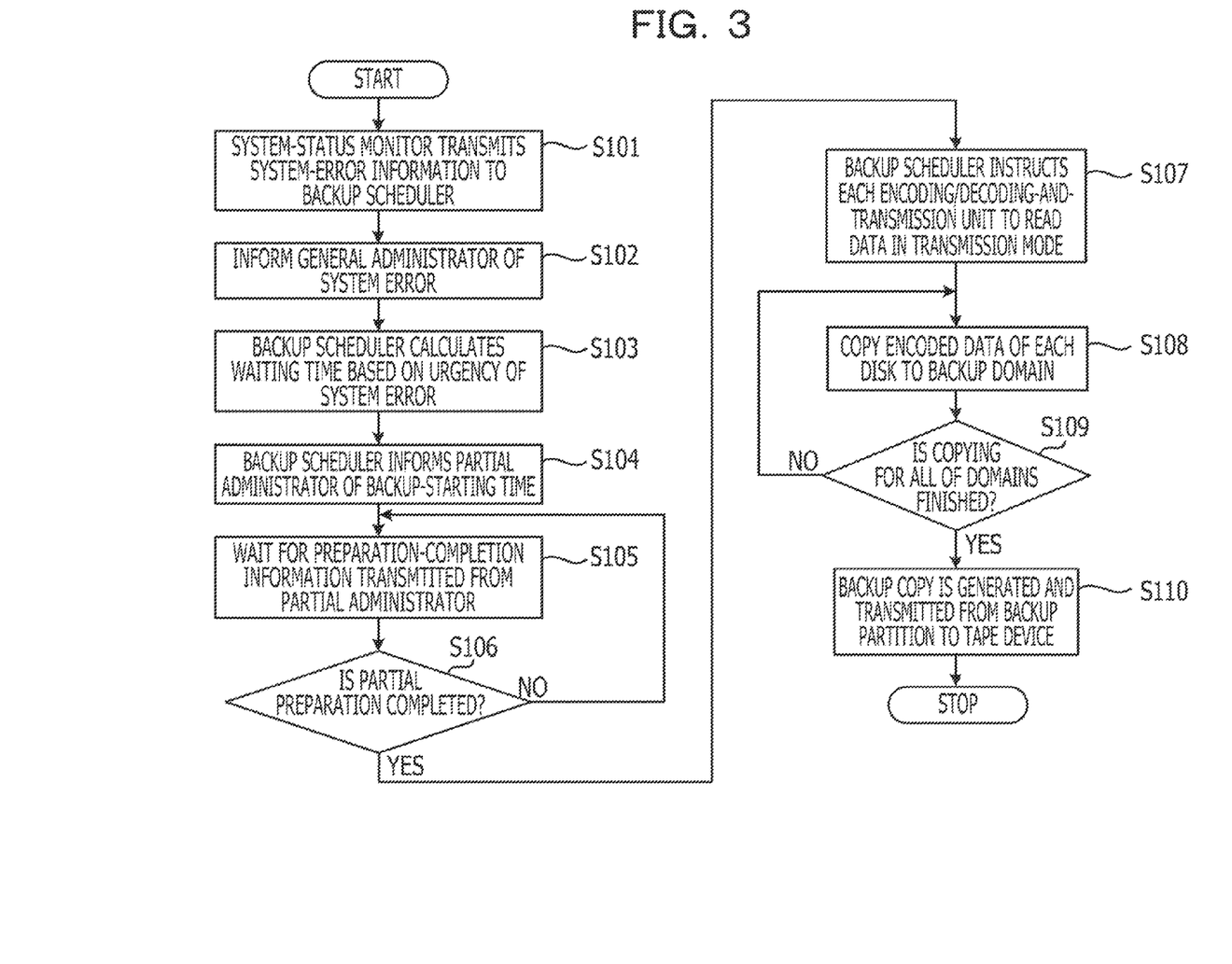
FIG. 3 is a flowchart illustrating operations that are performed to back up data.

FIG. 3 is a flowchart illustrating operations that are performed to back up data.

In the storage system 100, data is backed up during the emergency. The term "emergency" indicates the time when the system-status monitor 160 illustrated in FIG. 1 confirms an error occurring in the system. Then, during the emergency, the system-status monitor 160 transmits information about the system error to the backup scheduler 141, and the backup scheduler 141 receives the information through operation (S101). The system-error information includes information about the seriousness (urgency) of the system error. Upon receiving the system-error information with the backup scheduler 141, the system-administration unit 140 informs the administrator of the occurrence of the system error through the general console 310 as operation (S102). Further, the backup scheduler 141 calculates a waiting time provided to back up data based on the seriousness (urgency) of the system error with reference to a table which will be described below as operation (S103).

Figure 4:
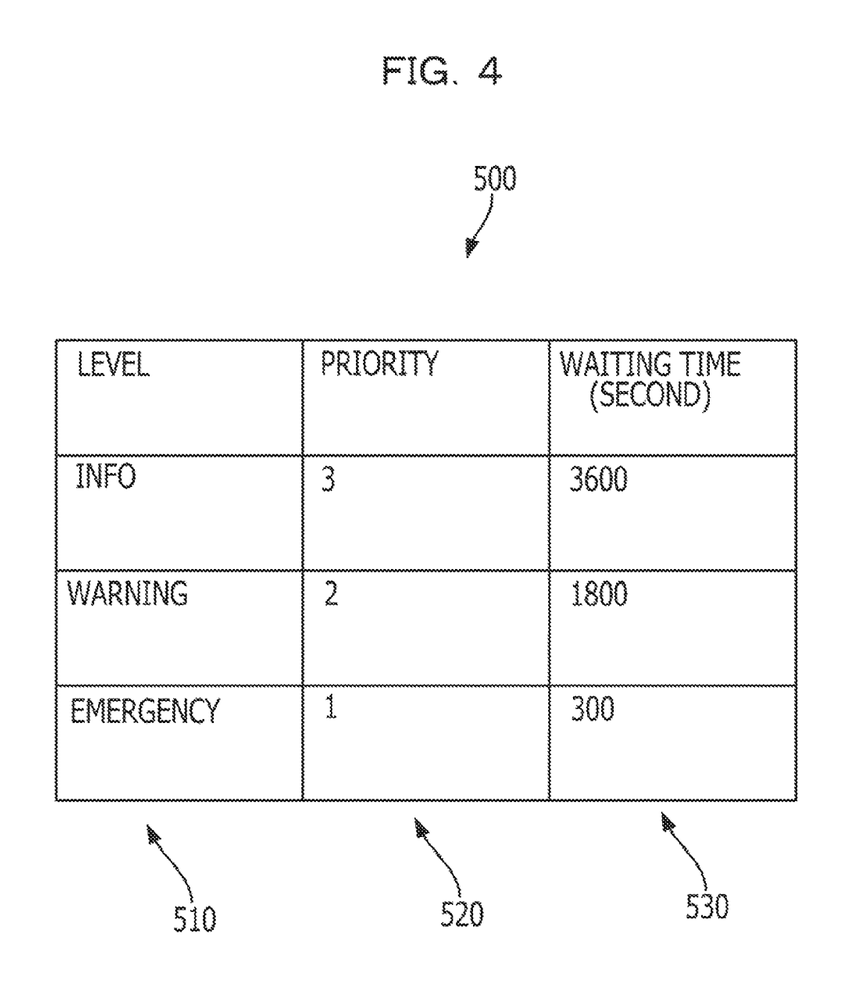
FIG. 4 illustrates a waiting-time table provided to calculate a waiting time.

FIG. 4 illustrates a waiting-time table 500 provided to calculate the waiting time.

The waiting-time table 500 illustrates a combination of error-level information 510, priority information 520, and waiting-time information 530. The error-level information 510 is included in information transmitted from the system-status monitor 160 to the backup scheduler 141. As a specific example of the error-level information 510, FIG. 4 illustrates three types of levels "INFO", "WARNING", and "EMERGENCY". The level "INFO" indicates the state where the administrator is informed of the system error, the level "WARNING" indicates the state where the administrator receives a warning, and the level "EMERGENCY" indicates a state of emergency. The priority information 520 indicates the priority order of the above-described levels. That is, the level "EMERGENCY" corresponds to priority "1", the level "WARNING" corresponds to priority "2", and the level "INFO" corresponds to priority "1". As the value of priority decreases, the priority order increases. Further, as the priority order indicated as the priority information 520 increases, the time assigned to the level corresponding to the priority order decreases, the time being indicated as the waiting-time information 530. More specifically, a waiting time of "300" seconds is assigned to the level "EMERGENCY" corresponding to the priority "1", a waiting time of "1800" seconds is assigned to the level "WARNING" corresponding to the priority "2", and a waiting time of "3600" seconds is assigned to the level "INFO" corresponding to the priority "3". Each of the waiting times is exemplarily illustrated in the waiting-time table 500.

The backup scheduler 141 obtains the waiting-time information 530 corresponding to the error-level information 510 by referring to the above-described waiting-time table 500.

After the waiting time is obtained through operation S103 illustrated in FIG. 3, the backup scheduler 141 informs each of the administrators of the obtained waiting time via the domain consoles 320A to 320C, as the backup-starting time reckoned from the current time. That is, the starting time is expressed as, for example, "The data backup will be started after MM minutes." through operation (S104). Upon being informed of the starting time, each of the administrators finishes jobs for which access to data should be made, the data being stored in a logical partition administered by the administrator, so that the data can be backed up. Then, the administrators inform the backup scheduler 141 that preparations for the data backup had been made via the individual domain consoles 320A to 320C.

After informing the administrators of the starting time, the backup scheduler 141 waits for information about the completion of preparations, the information being transmitted from each of the administrators, as operations (S105 and S106). After receiving the information transmitted from each of the administrators, which indicates that the answer is Yes for operation (S106), the backup scheduler 141 instructs each of the encoding/decoding-and-transmission units 120 to read data in transmission mode. That is, the backup scheduler 141 instructs each of the encoding/decoding-and-transmission units 120 to switch the switch 123. As a result, each of the logical partitions 110A to 110C is connected to the transmission unit 122 and the transmission unit 122 outputs the encoded data through operation (S107). When the switching of the switch 123 is completed, the backup scheduler 141 starts copying the encoded data from each of the logical partitions 110A to 110C, to the backup partition 110Z via the transmission unit 122, and the backup scheduler 141 waits until the encoded data is copied from each of the logical partitions 110A to 110C to the backup partition 110Z, which corresponds to operations (S108 and S109).

When the encoded data of all of the logical partitions 110A to 110C is copied to the backup partition 110Z, which means that the answer is Yes for operation (S109), the encoded data of the backup partition 110Z is grouped into a single file as an archive under the control of the backup scheduler 141. Then, data of the file is stored in the magnetic-tape device 200 via the emergency bus 132 and the host bus adaptor 170 under the control of the backup scheduler 141 through operation (S110). In the present invention, information of the entire storage system 100 is backed up through the above-described operations while saving the information administrator from having to back up the information. Further, since the information is backed up as the encoded data, the administrator, who has no information provided to decode the encoded data, is not able to view the details of the information. Therefore, the security of the information is maintained at the backup time.

In the present invention, the encoded data of the logical partition is copied to the backup partition 110Z, and the encoded data of the backup partition 110Z is stored in the magnetic-tape device 200. That is, the information is backed up in two stages. Usually, it is preferable that backed-up data be stored in a backup spot such as the magnetic-tape device 200 provided outside the information-storage system to protect the backed-up data against a disaster or the like. However, when data is transferred (copied) to the above-described backup spot provided outside the information-storage system, the time consumed for the data transfer (copying) is usually longer than that consumed for the data transfer (copying) performed inside the information-storage system. Therefore, the operation-interruption time consumed for the data backup is increased. Therefore, when the data backup is performed in two stages as described in the present embodiment, the operation-interruption time occurring in each of the logical partitions due to the data backup can be reduced. Further, the two-stage backup process allows for storing the data at a safe backup spot in the end, the backup spot being provided outside the information-storage system, which means that the following application mode is appropriate. According to the appropriate application mode, the above-described transmission unit stores the above-described encoded data in a first backup spot provided in the information-storage system. Further, according to the appropriate application mode, a backup-transfer unit is provided to transfer the encoded data from the first backup spot to a second backup spot provided outside the information-storage system.

The host bus adaptor 170 illustrated in each of FIGS. 1 and 2 corresponds to an example of the backup-transfer unit. Further, the backup partition 110Z illustrated in each of FIGS. 1 and 2 corresponds to an example of the first backup spot. Still further, the magnetic-tape device 200 corresponds to an example of the second backup spot.

In the present invention, data of all of the logical partitions is archived into a single file so that the data is backed up. However, the method of archiving data to back up the data for each of the logical partitions may be used for the information-storage system disclosed in this specification. If the above-described method is used, the data of all of the logical partitions is copied to the backup partition 110Z in decreasing order of the reception of information about the data-backup preparation completion, which may reduce the total time consumed for the data backup. Further, according to the information-storage system disclosed in this specification, data of a flag indicating in which unit data is archived may be provided in the system so that the data is archived in a unit indicated by the flag.

Hereinafter, a second embodiment of the information-storage system will be described. The second embodiment is equivalent to the above-described first embodiment except that the backup-start timing is determined differently from the first embodiment. Hereinafter, the difference between the first and second embodiments will be mainly described so as to reduce redundancy of the descriptions.

Figure 5:
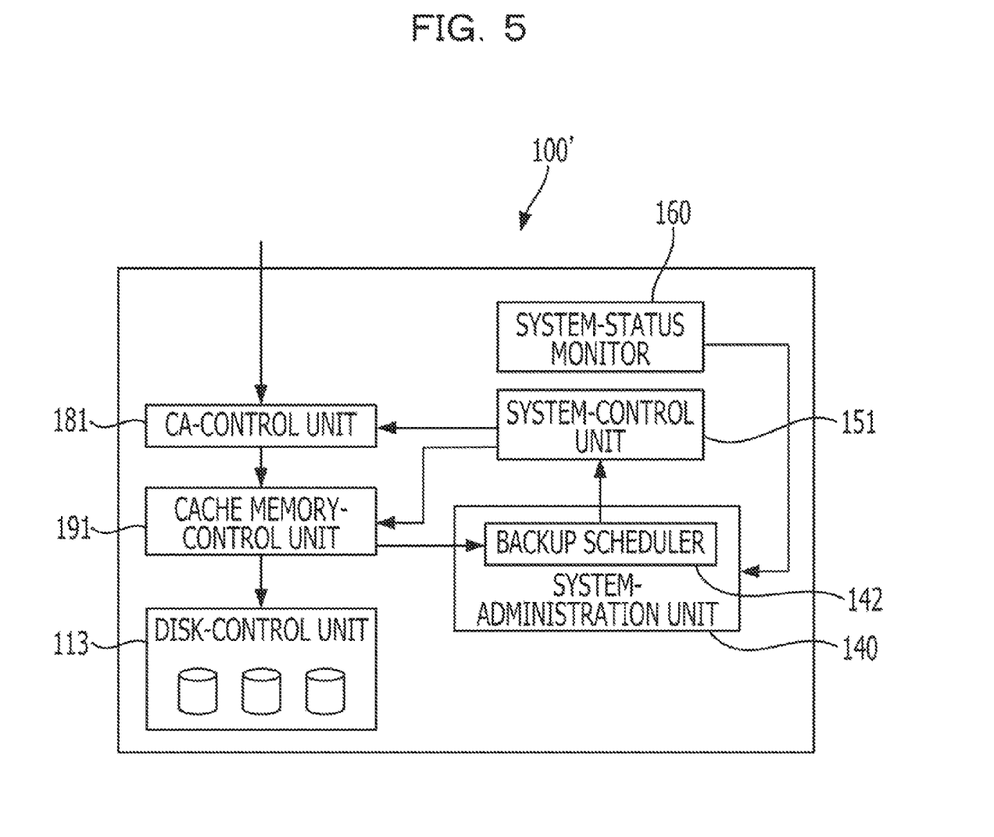
FIG. 5 illustrates details of a configuration part relating to the determination of the backup-start timing according to a second embodiment.

FIG. 5 illustrates the details of a configuration part relating to the determination of the backup-start timing according to the second embodiment.

FIG. 5 illustrates a storage system 100' according to the second embodiment. The storage system 100' includes the system-administration unit 140 and the system-status monitor 160, as is the case with the first embodiment.

Although a disk-control unit 113 provided in the storage system 100' is not illustrated in each of FIGS. 1 and 2, the disk-control unit 113 is attached to the hard disks 111 that are described in the first embodiment. Likewise, a channel adaptor (CA)-control unit 181 and a cache memory-control unit 191 are also attached to the individual channel adaptor 180 and cache memory 190 that are described in the first embodiment. As described above, data transmitted from an external server or the like passes through the channel adaptor 180 and flows into the hard disks 111 that are assigned to the logical partition via the cache memory 190. In accordance with the data flow, the data control is shifted from the CA-control unit 181 to the cache memory-control unit 191, and to the disk-control unit 113.

The storage system 100' of the second embodiment includes a backup scheduler 142 different from the backup scheduler 141 included in the storage system 100 of the first embodiment. The storage system 100' further includes a system-control unit 151 different from the system-control unit 150 included in the storage system 100.

When the system-status monitor 160 detects a system error so that a data backup should be performed, the backup scheduler 142 of the second embodiment informs the system-control unit 151 that the data backup should be performed. Upon being informed, the system-control unit 151 monitors the CA-control unit 181. Then, when write data is not transmitted from a server or the like to the channel adaptor 180 for a specified time period, the system-control unit 151 shifts the channel adaptor 180 to suspend mode via the CA-control unit 181. In the suspend mode, the channel adaptor-control unit 181 suspends transmitting data to the cache memory 190. Further, write data transmitted from a server or the like to the channel adaptor 180 during the suspend mode is queued within the channel adaptor 180 with the CA-control unit 181.

The cache memory-control unit 191 transmits data that is stored in the cache memory 190 and that is not yet written onto the hard disk 111 to the hard disk 111 based on an instruction transmitted from the system-control unit 151. When the cache memory 190 becomes empty of the above-described data, the cache memory-control unit 191 informs the backup scheduler 142 of the emptiness. By being triggered by the information, the backup scheduler 142 starts making backup copies of the encoded data of the logical partition and transmitting the backup copies to the backup partition.

Thus, in the second embodiment, the timing appropriate for the data backup is automatically determined based on the state where data is input to the storage system 100'. Therefore, the data backup can be started without the help of an administrator administering information, which means that the following application mode is appropriate.

The appropriate application mode provides a timing-determination unit determining the timing when the selection unit selects the transmission unit based on the state where data is input to the information-storage system, when the status-monitoring unit confirms the unusual status.

A combination of the system-control unit 151 and the backup scheduler 142 that are described in the second embodiment corresponds to an example of the timing-determination unit.

Each of the above-described embodiments illustrates the storage system including the normal bus through which the normal data passes and the emergency bus through which the encoded data passes during the emergency, as an appropriate example. According to the information-storage system disclosed in this specification, however, the normal data and the encoded data provided for the emergency may pass through a common bus.

Each of the above-described embodiments illustrates the configuration provided to make backup copies of the encoded data and transmit the backup copies to the backup partition provided in the storage system, as an appropriate example of the transmission unit. However, the transmission unit of the information-storage system may make backup copies of the encoded data and transmit the backup copies to, for example, the magnetic-tape device 200 provided outside the storage system.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information-storage system storing information, the information-storage system comprising:
    an information-storage unit configured to store data;
    an encoding/decoding unit configured to encode and store input data in the information-storage unit, and decode and output the encoded data stored in the information-storage unit upon receiving a request for an information output;
    a transmission unit configured to output the encoded data stored in the information-storage unit, the encoded data being left undecoded, and store the encoded data in a backup spot different from the information-storage unit;
    a status-monitoring unit configured to monitor an unusual status of the information-storage system; and
    a selection unit configured to select the transmission unit between the encoding/decoding unit and the transmission unit when the status-monitoring unit confirms the unusual status of the information-storage system.

2. The information-storage system according to claim 1, further comprising:
    a first bus, which is connected to the encoding/decoding unit, through which each of data that is stored in the information-storage unit via the encoding/decoding unit and data that is output from the information-storage unit via the encoding/decoding unit passes; and
    a second bus, which is isolated from the first bus and connected to the transmission unit, through which the encoded data output from the information-storage unit via the transmission unit passes.

3. The information-storage system according to claim 2, further comprising:
    a timing-determination unit configured to determine timing when the transmission unit is selected based on a state where data is input from an external device to the information-storage system, when the status-monitoring unit confirms the unusual status.

4. The information-storage system according to claim 3, further comprising:
    a backup-data transfer unit configured to transfer the encoded data from a first backup spot provided in the information-storage system to a second backup spot provided outside the information-storage system,
    wherein the transmission unit stores the encoded data in the first backup spot.

5. A method of storing information in an information-storage system comprising:
    encoding input data;
    storing the input data in an information-storage unit;
    transmitting the encoded data stored in the information-storage unit;
    storing the encoded data in a backup spot different from the information-storage unit;
    monitoring an unusual status of the information-storage system; and
    selecting the transmitting when the unusual status of the information-storage system is confirmed at the status-monitoring.

6. The method according to claim 5,
    wherein data is stored in and/or output from the information-storage unit via an encoding/decoding unit by using a first bus connected to the encoding/decoding unit, and
    wherein the encoded data is output from the information-storage unit via a transmission unit by using a second bus, which is isolated from the first bus and connected to the transmission unit.

7. The method according to claim 6, further comprising:
    determining a timing when the transmitting is selected based on a state where data is input from an external device to the information-storage system, when the unusual status is confirmed at the status-monitoring.

8. The method according to claim 7, further comprising:
    transferring the encoded data from a first backup spot provided in the information-storage system to a second backup spot provided outside the information-storage system,
    wherein the encoded data is stored in the first backup spot at the transmitting.

* * * * *